United States Patent
Deardurff, Jr. et al.

(10) Patent No.: US 10,294,382 B2
(45) Date of Patent: *May 21, 2019

(54) MAGENTA INKS

(71) Applicant: Hewlett-Packard Development Company, L.P., Fort Collins, CO (US)

(72) Inventors: Larrie Deardurff, Jr., Corvallis, OR (US); Jayprakash C. Bhatt, Corvallis, OR (US); Cory J. Ruud, Corvallis, OR (US); Sterling Chaffins, Corvallis, OR (US); Matthew Thornberry, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/994,642

(22) Filed: May 31, 2018

(65) Prior Publication Data

US 2018/0273784 A1  Sep. 27, 2018

Related U.S. Application Data

(63) Continuation of application No. 15/308,788, filed as application No. PCT/US2014/040823 on Jun. 4, 2014, now Pat. No. 10,047,233.

(51) Int. Cl.
| | | |
|---|---|---|
| *C09D 11/322* | (2014.01) | |
| *C09D 11/102* | (2014.01) | |
| *C09D 11/38* | (2014.01) | |
| *C09B 67/22* | (2006.01) | |

(52) U.S. Cl.
CPC ........ *C09D 11/322* (2013.01); *C09B 67/0033* (2013.01); *C09B 67/0041* (2013.01); *C09D 11/102* (2013.01); *C09D 11/38* (2013.01)

(58) Field of Classification Search
CPC ..... C09D 11/322; C09D 11/102; C09D 11/38; C09B 67/0041; C09B 67/0036
USPC .................... 106/31.77, 31.88, 495
See application file for complete search history.

(56) References Cited

U.S. PATENT DOCUMENTS

| | | |
|---|---|---|
| 5,580,372 A | 12/1996 | Gino et al. |
| 5,643,357 A | 7/1997 | Breton et al. |
| 5,688,626 A | 11/1997 | Patel et al. |
| 5,811,213 A | 9/1998 | Chiba |
| 5,837,044 A | 11/1998 | Santilli et al. |
| 6,667,140 B2 | 12/2003 | Tosaka et al. |
| 6,730,155 B2 | 5/2004 | Gotoh et al. |
| 7,250,078 B2 | 7/2007 | Iijima et al. |
| 7,288,351 B2 | 10/2007 | Yaguchi et al. |
| 7,390,901 B2 | 6/2008 | Yang et al. |
| 7,429,293 B2 | 9/2008 | Cai |
| 7,806,971 B2 | 10/2010 | Saito et al. |
| 7,922,316 B2 | 4/2011 | Bannai et al. |
| 7,922,800 B2 | 4/2011 | Bauer et al. |
| 8,137,721 B2 | 3/2012 | Wen et al. |
| 8,465,894 B2 | 6/2013 | Yamanaka et al. |
| 8,500,897 B2 | 8/2013 | Tateishi |
| 8,710,116 B2 | 4/2014 | Valentini et al. |
| 9,187,661 B2 | 11/2015 | Prasad |
| 9,340,694 B2 | 5/2016 | Oura et al. |
| 10,040,959 B2 * | 8/2018 | Deardurff ............ C09D 11/322 |
| 10,047,233 B2 * | 8/2018 | Deardurff ............ C09D 11/322 |
| 2002/0009547 A1 | 1/2002 | Ito et al. |
| 2004/0252169 A1 | 12/2004 | Chen et al. |
| 2005/0008960 A1 | 1/2005 | Yaguchi |
| 2005/0039634 A1 | 2/2005 | Hermansky |
| 2005/0182154 A1 | 8/2005 | Berge et al. |
| 2006/0046178 A1 | 3/2006 | Akiyama et al. |
| 2006/0258775 A1 | 11/2006 | Lee |
| 2009/0169761 A1 | 7/2009 | Szajewski et al. |
| 2010/0285287 A1 | 11/2010 | Matsuyama et al. |
| 2010/0302326 A1 | 12/2010 | Morohoshi et al. |
| 2011/0030580 A1 | 2/2011 | Jackson et al. |
| 2012/0050383 A1 | 3/2012 | Takayama et al. |
| 2012/0183894 A1 | 7/2012 | Matsumoto et al. |
| 2013/0063518 A1 | 3/2013 | Takebayashi et al. |
| 2013/0065998 A1 | 3/2013 | Lai et al. |
| 2013/0079442 A1 | 3/2013 | Ma et al. |
| 2013/0307914 A1 | 11/2013 | Chen et al. |
| 2013/0327247 A1 | 12/2013 | Khavari |
| 2014/0247312 A1 | 9/2014 | Prasad |
| 2017/0022383 A1 | 1/2017 | Prasad et al. |
| 2017/0066940 A1 | 3/2017 | Deardurff et al. |
| 2017/0183522 A1 | 6/2017 | Chaffins et al. |
| 2017/0183523 A1 | 6/2017 | Deardurff et al. |
| 2018/0194958 A1 * | 7/2018 | Bhatt ................... C09D 11/322 |
| 2018/0298213 A1 * | 10/2018 | Bhatt ................... C09D 11/322 |

FOREIGN PATENT DOCUMENTS

| | | |
|---|---|---|
| EP | 1321495 | 6/2003 |
| EP | 1333070 | 8/2003 |
| EP | 2025726 | 2/2009 |
| EP | 2568017 | 3/2013 |

(Continued)

OTHER PUBLICATIONS

English translation of JP 2003/140396, dated May 2003; 45 pages.*
International Search Report dated Feb. 26, 2015 for PCT/US2014/040823, Applicant Hewlett-Packard Development Company, L.P.
English translation of JP2013088482, dated May 2013.
English translation of JP2006057044, dated Mar. 2006.

*Primary Examiner* — Helene Klemanski

(74) *Attorney, Agent, or Firm* — Thorpe North & Western LLP

(57) ABSTRACT

The present disclosure is drawn to a dispersed magenta pigment blend, including a first pigment including Pigment Violet 19 and Pigment Red 122, or Pigment Red 282; and a second pigment including Pigment Red 150. The weight ratio of the first pigment to the second pigment can be from 50:50 to 80:20 by pigment solids content.

20 Claims, 2 Drawing Sheets

(56) References Cited

FOREIGN PATENT DOCUMENTS

| | | |
|---|---|---|
| EP | 2671928 | 12/2013 |
| JP | S56103262 | 8/1981 |
| JP | 2003140396 | 5/2003 |
| JP | 2006057044 | 3/2006 |
| JP | 2007140076 | 6/2007 |
| JP | 2013088482 | 5/2013 |
| WO | 2008048869 | 4/2008 |
| WO | 2013015813 | 1/2013 |
| WO | 2013052036 | 4/2013 |
| WO | 2015105503 | 7/2015 |

* cited by examiner

MAGENTA INKS

The present application is a continuation application of U.S. patent application Ser. No. 15/308,788, filed on Nov. 3, 2016, now U.S. Pat. No. 10,047,233, which is a national stage application of PCT/US2014/040823, filed on Jun. 4, 2014, each of which is incorporated herein by reference.

BACKGROUND

There are several reasons that inkjet printing has become a popular way of recording images on various media surfaces, particularly paper. Some of these reasons include low printer noise, capability of high-speed recording, and multi-color recording. Additionally, these advantages can be obtained at a relatively low price to consumers. Though there has been great improvement in inkjet printing, accompanying this improvement are increased demands by consumers, e.g., higher speeds, higher resolution, full color image formation, increased stability, large format printing, etc. A few characteristics of inkjet printing systems that are desirable to achieve relate to nozzle health, short term and sustained decap performance, kogation, color gamut, durability, ink efficiency, to name a few. Accordingly, investigations continue into developing ink formulations that can be printed accurately and with acceptable durability without excessive clogging.

DETAILED DESCRIPTION

Figure 1:
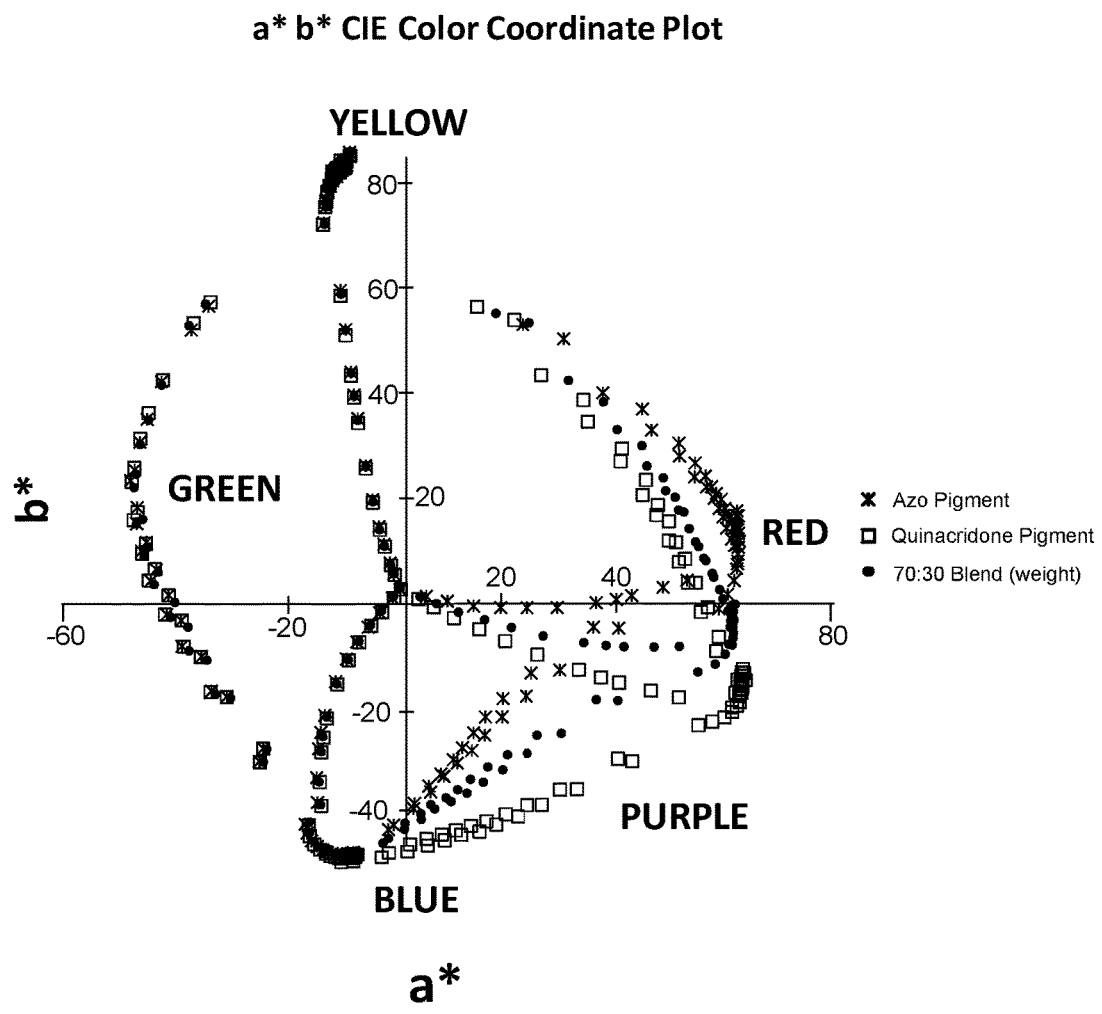
FIG. 1 is an example a*b*CIE Color Coordinate Plot in accordance with examples of the present disclosure.

The present disclosure is drawn to magenta inkjet inks which include a blend of multiple magenta pigments. In preparing magenta inks generally, the selection of a pigment can be such that it exhibits acceptable color properties. However, formulating an inkjet ink with appropriate solvents, surfactants, and other liquid vehicle components with an appropriate pigment that performs well in every color space is not as simple as selecting components and admixing them together. For example, a magenta pigment can be selected to produce an acceptable red color when combined with a yellow pigment in a typical ink jet printer system may not necessarily have good color strength in the blue or violet regions when mixed with cyan pigments. On the other hand, a different magenta pigment that may have good color strength in the blue and violet region when combined with a cyan pigment may be deficient in the red regions (again, when combined with yellow). In either case, the overall color gamut is when the selected pigment or pigment dispersion does not perform well along the entire color spectrum, causing an observer of an inkjet print to be dissatisfied due to either too little or red or too little blue color. By blending various magenta pigments together, a tradeoff between acceptable blue and acceptable red color strength can be achieved.

With this background in mind, in accordance with the examples described herein, various details are provided herein which are applicable to a magenta ink, a magenta pigment blend, and a method of formulating a magenta ink of the present disclosure. In one example, a magenta ink can include a liquid vehicle including water, organic co-solvent, and surfactant, and the magenta ink can from 2 wt % to 9 wt % of magenta pigment blend suspended in the liquid vehicle. The magenta pigment blend can include quinacridone pigment and azo pigment. The quinacridone pigment can have the general structure:

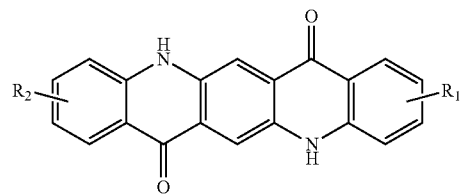

wherein $R_1$ and $R_2$ are each independently H, a halogen atom, or a $C_1$ to $C_4$ alkyl group. The azo pigment can have the general structure:

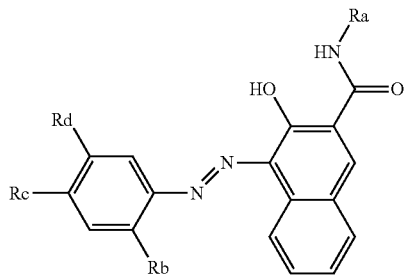

wherein $R_a$ is H, aryl, or $C_1$ to $C_4$ alkyl, but when $R_a$ is aryl, the aryl is not a phenyl group having at least one hydrogen that has been substituted with a chlorine atom; and wherein $R_b$, $R_c$ and $R_d$ are independently H, a $C_1$ to $C_4$ alkyl, an oxygen-containing functional group, a nitrogen-containing functional group, or a sulphur-containing functional group. With these magenta inks, to balance the red and blue color strength of the magenta color, the weight ratio of quinacridone pigment to azo pigment can be from 50:50 to 80:20 by pigment solids content. It is noted that there can be multiple quinacridone pigment and/or azo pigments in the magenta ink (or magenta pigment blend described hereinafter), and it is the total weight percentage of quinacridone pigment and/or azo pigment that is used to calculate the weight ratio of pigments as well as pigment solids concentration in the ink as a whole.

In another example, a magenta pigment blend can include a solid solution of quinacridone pigment, namely Pigment Violet 19 and Pigment Red 122, or Pigment Red 282; admixed with azo pigment, namely Pigment Red 150. The weight ratio of the quinacridone pigment to the azo pigment can be from 50:50 to 80:20 by pigment solids content. These pigments have the following structures:

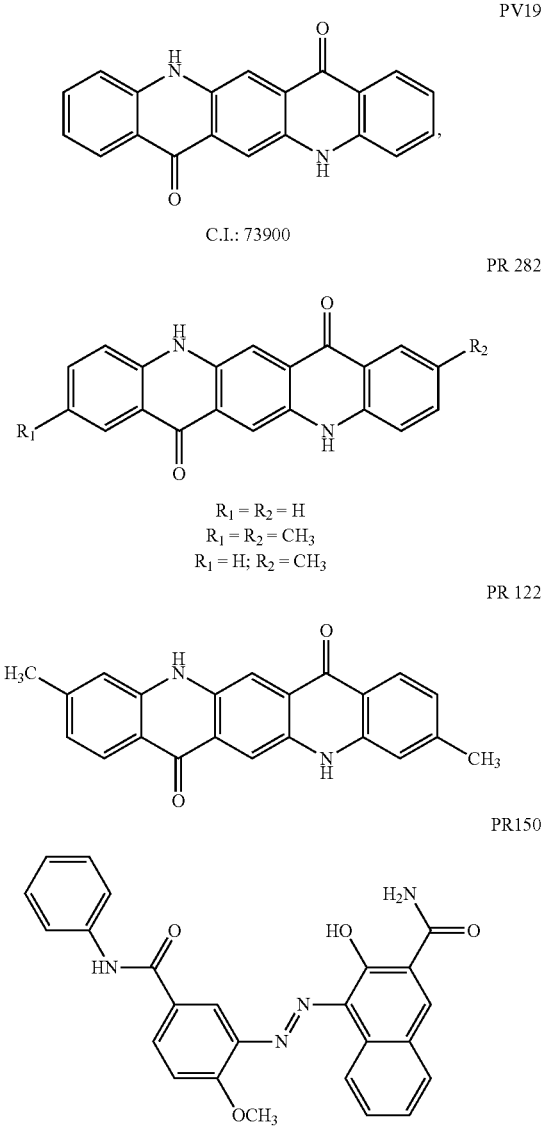

In another example, a method of formulating a magenta pigment blend can include co-dispersing a first pigment a second pigment together. The first pigment typically has a stronger color strength in the red areas of CIE Color Coordinate Plot compared to its color strength in the blue areas, and the second pigment typically has stronger color strength in blue areas compared to its color strength in red areas. The first pigment and the second pigment can be co-dispersed at a weight ratio to improve color strength in the blue areas compared to the first pigment and to improve color strength in the red areas compared to the second pigment. By "stronger" color strength, what is meant is a larger color saturation, defined as the chromaticity divided by the lightness (CIE C*/L*) at a desired or predetermined hue angle. Typically for red, the hue angle can be from 30° to 15°, with the variability being dependent on the print media and end use. For blue, the hue angle can be from 260° to 280°, again depending on the media and application. In one example, the hue angle for red can be measured at 17° and for blue at 270°. As an example, for red, a saturation of greater than 0.71 can be desirable and for blue a saturation of greater than 0.64 can be desirable. FIG. 1 illustrates the problems associated with red color strength and violet color strength. Specifically, two pigment dispersion types were evaluated (quinacridone and azo separately), and then a blend of the two pigment dispersions (quinacridone and azo together) were also evaluated. As can be seen in the FIG. 1, within the yellow and green regions both quinacridone pigment and azo pigment perform very similarly (when mixed with other inks appropriate for generating those colors), and it is only in the blue to violet to red regions where the two types of pigment dispersions separate in their color profile. By blending the pigments at about a 70:30 weight ratio (quinacridone pigment to azo pigment), an acceptable average red, violet, and blue can be achieved that is relatively close in color to each of the pigment dispersions alone. The ratio can alternatively range from about 50:50 to about 80:20, by weight, with acceptable results as well. As mentioned, in this example, the quinacridone pigment is good for achieving good blue color strength, and the azo pigment works well for achieving good red color strength. Purple color strength ends up being more of an average between that which is provided by both of the pigments, which is also made to be more acceptable by the blending of these two pigment dispersions. Further details regarding FIG. 1 and can be found in the Examples.

As mentioned, although the problem of red and blue color strength can be solved to some degree by blending these two pigment dispersions together, the problem is not as simple as mixing the two materials. In order to have good reliability and long storage life, the total amount (wt %) of the pigment solids in the ink should not be raised above normally acceptable levels of total pigment solids. Thus, available mixtures of quinacridone pigment and azo pigment can be formulated to follow the equation: wt % quinacridone pigment+wt % azo pigment=X. In this equation, the wt % of azo solids can be at a concentration where the ink produces an acceptable red color but more blue is needed, and wt % of quinacridone solids can be at a concentration where the ink produces an acceptable blue color but more red is needed. Thus, as azo pigment decreases, the red color decreases but the blue increases as quinacridone pigment increases. At some point within the range of blends, a ratio of azo pigment and quinacridone strikes a balance that is pleasing to an observer in the blue regions and the red regions.

Figure 2:
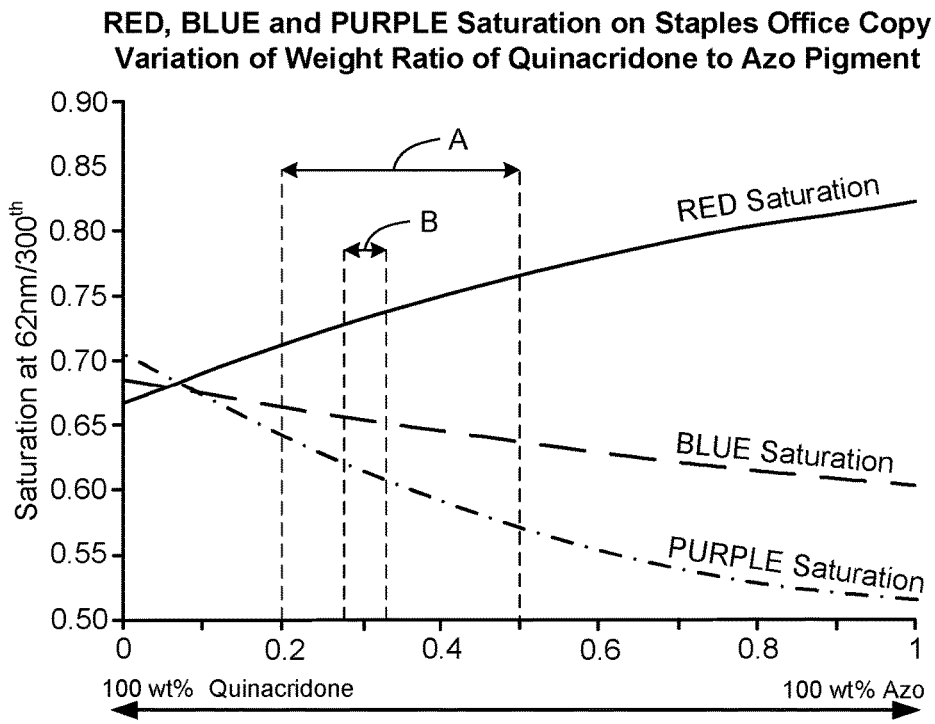
FIG. 2 is an example graph that illustrates saturation value curves for multiple colors for various weight ratios of quinacridone and azo pigments in accordance with examples of the present disclosure.

FIG. 2 illustrates various the weight ratios of quinacridone pigment to an azo pigment. As can be seen in this FIG., region A indicates an area where an acceptable color balance is struck between blues and reds, which corresponds to a weight ratio of 50:50 to 80:20 of quinacridone pigment to azo pigment. Also shown at region B, an alternative ratio range is shown that also strikes a balance between the pigment dispersions, which corresponds to a weight ratio range of about 65:35 to 75:25. Further details regarding FIG. 2 and can be found in the Examples.

In accordance with another example of the present disclosure, the pigments described herein are selected or formulated so that they do not have differential settling properties within the ink. If different settling profiles were present within the ink, then the pigment ratio would change with time at various levels within the ink, resulting in unacceptable color shifts. Thus, in accordance with examples herein, the pigments can have similar dispersant technology associated with the surface thereof, providing similar settling profiles. For example, all of the pigments present in the blend can be formulated to settle over time. To validate this, the UV-vis mixture of the quinacridone pigment and the azo pigment can have an absorbance maxima with a ratio dependent on the relative concentration of each. This ratio should remain constant within ±3% to be considered to have similar settling properties.

One advantage of utilizing the pigment blends of the present disclosure is that the inks prepared can be devoid of any dye, in one example. Without dyes, the durability and water or humid fastness can be improved. Additionally, with these type of pigmented inks, no external printer assistance, such as special paper or extra fixer inks is needed, though they can be optionally used. This can simplify the printer system and lower the cost of the entire system. Furthermore, printer system complexity can also be decreased resulting in more reliable printers. Furthermore, since the weight ratio of the pigments can be modified, these inks can be adaptable to match the needs of future ink formulations and/or printers.

The pigments that can be used in accordance with embodiments of the present disclosure include both self-dispersed pigments as well as conventionally dispersed pigments, e.g., pigments dispersed by a separate dispersing agent that is not covalently attached to the surface. If self-dispersed, a dispersant is typically prepared in a precursor form, and then the precursor is attached to the pigment to chemically modify the surface of the pigment. In one example, the dispersant can be attached to the pigment using various precursor materials, such as para-aminobenzoic acids, isophthalic acids, tricarboxylic acids, carboxylic groups, sulfonylic groups, phosphates, oligomers, polymers, and isomers thereof, for example. Other precursors can also be used to attach to the pigment, as would be known by those skilled in the art.

Typically, the pigments of the present disclosure can be from about 5 nm to about 10 μm in size, and in one aspect, the pigments can be from 10 nm to about 500 nm in size, although sizes outside this range can be used if the pigment can remain dispersed and provide adequate printing properties.

In further detail regarding the pigments, with inks generally, colorants used to improve color gamut on the hue-saturation plane are often dyes rather than pigments. However, dye based inks can have poor durability (e.g. water fastness, light fastness, and air/ozone fastness). Inkjet ink formulations prepared in accordance with the present disclosure, even without the presence of dyes, can have acceptable color gamut, while at the same time providing acceptable decap performance and improved durability compared to dye-based inks.

Though the inkjet ink in each of these embodiments can be fired from a variety of different types of inkjet architecture, it is noteworthy to point out that these inks can be fired very rapidly with improved decap performance, and thus are suitable for printing from both carriage type printheads as well as printhead bars, such as page wide printhead assemblies or other print bars.

In further detail with respect to the surfactant, there are several surfactants that can be selected for use in the inkjet inks of the present disclosure. Non-limiting examples of suitable surfactants include nonionic surfactant, cationic surfactant, and combinations thereof. In one example, the surfactant can be a nonionic surfactant. Several commercially available nonionic surfactants that can be used in the formulation of the pre-treatment composition include ethoxylated alcohols such as those from the Tergitol® series (e.g., Tergitol® 15S30, or Tergitol® 15S9), manufactured by Dow Chemical; surfactants from the Surfynol® series (e.g. Surfynol® 104, Surfynol® 440 and Surfynol® 465), and Dynol™ series (e.g. Dynol™ 607 and Dynol™ 604) manufactured by Air Products and Chemicals, Inc.; fluorinated surfactants, such as those from the Zonyl® family (e.g., Zonyl® FSO and Zonyl® FSN surfactants), manufactured by E.I. DuPont de Nemours and Company; Alkoxylated surfactant such as Tego® Wet 510 manufactured from Evonik; fluorinated PolyFox® nonionic surfactants (e.g., PF159 nonionic surfactants), manufactured by Omnova; or combinations thereof. Suitable cationic surfactants that may be used in the pre-treatment composition include long chain amines and/or their salts, acrylated diamines, polyamines and/or their salts, quaternary ammonium salts, polyoxyethylenated long-chain amines, quaternized polyoxyethylenated long-chain amines, and/or combinations thereof.

One surfactant that can be used is an acetylenic diol non-ionic surfactant, typically present at from 0.05 wt % to 2 wt % based on the ink as a whole. An example of an acetylenic diol non-ionic surfactant is Surfynol® 104 (2,4,7,9-tetramethyl-5-decyne-4,7-diol). Other surfactants that can be selected for use include polysorbates, $C_{12}$-$C_{18}$ polyoxyethylene glycol ethers, or a perfluoropolyethers.

Polysorbate surfactants, generally, include Polysorbate 20 (or polyoxyethylene 20 sorbitan monolaurate), Polysorbate 40 (or polyoxyethylene 20 sorbitan monopalmitate), Polysorbate 60 (or polyoxyethylene 20 sorbitan monostearate), Polysorbate 80 (or polyoxyethylene 20 sorbitan monooleate), or the like. However, not all of these polysorbates have at least 50 wt % lipophilic oleic acid groups and having an HLB value of less than 15. Brand names for these polysorbate surfactants include those sold under the tradename Tween® or Alkest®. Regarding the nomenclature of these polysorbates, the number "20" following "polyoxyethylene" refers to the total number of oxyethylene —(CH$_2$CH$_2$O)— groups found in the molecule. The number 20, 40, 60, or 80 following "polysorbate" is related to the type of fatty acid associated with the polyoxyethylene sorbitan portion. Monolaurate is indicated by 20, monopalmitate is indicated by 40, monostearate by 60 and monooleate by 80.

Other polysorbates can likewise be used, including Polysorbate 85, or Tween® 85, which is polyethylene glycol sorbitan trioleate; or Polysorbate 81, or Tween® 81, which is a polyoxyethylene (5) sorbitan monooleate. Tween® 85 and Tween® 81 are oleyl type compounds and include 70 wt % oleic acid. Polyoxyethylene sorbitan dioleate can also be used.

Another surfactant that can be used includes polyoxyethylene glycol ethers, including those having the base structure, as follows: $CH_3(CH_2)_n(CH_2CH_2O)_mH$, where m can be from 2 to 100, but is typically from about 2 to about 20; and n can be from about 8 to 20. In one particular example, the polyoxyethylene glycol ether can have a tolerance of up to 1 "cis" unsaturated (oleyl) group, e.g., 0 or 1 "cis" group (which would reduce the total number of hydrogen atoms by 2 in the base structure described above, as a double bond would exist along the alkyl chain portion of the formula. Thus, oleyl type surfactants are included in this definition, even though they do not strictly fit within the above structural formulation, as the formulation is provided merely for convenience. Examples surfactants that can be used include Brij® S, Brij® O, Brij® C, and Brij® L type surfactants Synperonic surfactants can also be used. Specific examples include Brij® S10, Brij® S5, Brij®, S15, Brij® S20, Brij® S2/93, Brij® S7, Brij® 98/020, Brij® 010, Brij® 02, Brij®, 03, Brij® 05, Brij® C2, Brij® C7, Brij® 010, Brij®, C20, Brij® L4/30, Brij® L9, Brij® L15, Synperonic® 91-2.5, Synperonic® 91-2.5, or Synperonic® 91-10, to name a few.

In yet another alternative example, perfluoropolyethers can be included. Some examples can include a primary alcohol or diol, such as Fluorolink® D (HOCH$_2$CF$_2$O(CF$_2$CF$_2$O)$_p$(CF$_2$O)$_q$CF$_2$CH$_2$OH); Fluorolink® E (HO(CH$_2$CH$_2$O)$_n$CH$_2$CF$_2$O(CF$_2$CF$_2$O)$_p$(CF$_2$O)$_q$CF$_2$CH$_2$(OCH$_2$CH$_2$)$_n$OH); Fluorolink® C10 (HOOCCF$_2$O(CF$_2$CF$_2$O)$_p$(CF$_2$O)$_q$CF$_2$COOH); or Fluorolink® T (HOCH$_2$CH(OH)CH$_2$OCH$_2$CF$_2$O(CF$_2$CF$_2$O)$_p$(CF$_2$O)$_q$CF$_2$CH$_2$OCH$_2$CH(OH) CH$_2$OH), for example. In these examples, p+q can be 20 to 200, or from 40 to 180. Also, p/q can be 0.25 to 5, or can be from 0.5 to 2. n can be from 1 to 6, or from 1 to 4, or from 1 to 2.

In the inkjet inks described herein, suitable co-solvents for use include water and water soluble organic co-solvents. Any of a number of solvents can be used, but in accordance with examples of the present disclosure, certain organic co-solvents are used to provide some of the benefits described herein. Triethylene glycol is one such solvent. Triethylene glycol provides the benefit of acting as a humectants providing improved short term decap performance. Additionally, the presence of a cyclic amide can provide certain benefits, including short term and sustained decap, and these solvents can work well with the surfactants described herein. In one example, there can be two cyclic amides present. For example, a combination of 2-pyrrolidinone and Dantocol [di(2-hydroxyethyl)-5,5-dimethylhydantoin] can be particularly effective together. Benefits provided by this combination of cyclic amides include assistance with nozzle health and trajectory at certain concentrations and ratios. It is noted that in one example, the presence of triethylene glycol, Dantocol, and 2-pyrrolidinone strongly interact with one another, so formulations that utilize all three tend to perform better with respect to short term decap, sustained decap, and trajectory than systems without all three solvents.

Examples of water soluble organic co-solvents that may additionally be used include, but are not limited to, aliphatic alcohols, aromatic alcohols, diols, triols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, co-solvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides. Specific examples of certain co-solvents that may likewise be used include, but are not limited to, 1,5-pentanediol, Liponic ethoxylated glycerol 1 (EG-1), Liponic ethoxylated glycerol 7 (EG-7), 2-methyl-2,4-pentanediol, 2-methyl-1,3-propanediol, 2-ethyl-2-hydroxymethyl-1,3-propanediol, diethylene glycol, 3-methoxybutanol, propylene glycol monobutyl ether, 1,3-dimethyl-2-imidazolidinone, and derivatives thereof. Co-solvents can be added to reduce the rate of evaporation of water in the inkjet ink to minimize clogging or provide other improved properties related to viscosity, pH, surface tension, optical density, gamut, durability, decap, and print quality, for example. The water soluble organic co-solvent system total concentration can range from about 5 wt % to about 50 wt %, or from 10 wt % to 40 wt %. Each organic co-solvent alone can be typically present at from about 0.1 wt % to about 20 wt % of the inkjet ink composition. This being said, the solvents may be present in the inkjet ink composition at any concentration that is effective for use.

In another aspect of the present disclosure, various biocides can be used to inhibit growth of undesirable microorganisms. Several non-limiting examples of suitable biocides include benzoate salts, sorbate salts, and commercial products such as Nuosept®, Ucarcide®, Vancide®, Proxel® GXL, Anticide® B20 or M20, Kordex® MLX, for example. Typically, such biocides include less than about 5 wt % of the inkjet ink composition and often from about 0.05 wt % to about 2 wt %.

Additionally, in order to improve durability further, a binder can be included in the inkjet inks of the present disclosure as well. Though the addition of a binder can improve durability, too much binder can significantly impact decap performance negatively. Thus, a balance between decap performance and durability can be considered when adding binder to the formulations of the present disclosure.

An exemplary binder that can be included in the inkjet ink is a Hydran™ RW-7500 or Hydran™ RW-7581 from DIC, which are polyurethane binders obtained by reacting a polyol containing a vinyl polymer having two hydroxyl groups at one end and at least one polyol. Other suitable binders that can be used include other water-dispersible or water soluble polymers. Examples of polymer classes include acrylics, styrenics, polyethylenes, polypropylenes, polyesters, polyamides, (other) polyurethanes, polyureas, polyethers, polycarbonates, polyacid anhydrides, and copolymers and/or combinations thereof. Such polymer particles can be iono-meric, film-forming, non-film-forming, fusible, or heavily crosslinked, and can have a wide range of molecular weights and glass transition temperatures.

Examples of useful polymeric binders include styrene-acrylic copolymers sold under the trade names Joncryl® (S.C. Johnson Co.), Ucar™ (Dow Chemical Co.), Jonrez® (MeadWestvaco Corp.), and Vancryl® (Air Products and Chemicals, Inc.); sulfonated polyesters sold under the trade name Eastman AQ® (Eastman Chemical Co.); polyethylene or polypropylene resin emulsions and polyurethanes (such as the Witcobonds® from Witco); polyacrylic type polymers such as polyacrylic acid and styrene-acrylic methacrylic acid copolymers (such as Joncryl® 70 from S.C. Johnson Co., TruDot™ IJ-4655 from MeadWestvaco Corp., and Vancryl® 68S from Air Products and Chemicals, Inc. These polymers can be used because they are compatible in typical aqueous-based inkjet ink compositions, and because they render printed images that are highly durable towards physical abrasion. Binders are normally included in the inkjet inks of the present disclosure at from 0.1 wt % to 3 wt %, but more typically from 0.5 wt % to 2 wt %, based on the polymer solids content.

Other known additives can also be included, as known in the art.

It is noted that, as used in this disclosure, the singular forms "a," "an," and "the" include plural referents unless the context clearly dictates otherwise. Thus, for example, reference to "an inkjet ink" includes one or more of such inks, and reference to "the pigment" includes reference to one or more amounts of pigments.

As used herein, "liquid vehicle" or "ink vehicle" refers to the liquid fluid in which colorant is dispersed or dissolved to form an ink. Liquid vehicles are well known in the art, and a wide variety of ink vehicles may be used in accordance with embodiments of the present disclosure. Such liquid vehicles may include a mixture of a variety of different agents, including without limitation, surfactants, organic co-solvents, buffers, biocides, viscosity modifiers, sequestering agents, stabilizing agents, and/or water. The liquid vehicle can also carry other additives such as latex particulates, binders, or other polymers, in some embodiments. It is noted that though the liquid vehicles of the present disclosure can include many of these ingredients, the present technology relates more specifically to the use of certain specific organic co-solvents and/or surfactants as set forth herein.

As used herein, "ink" or "inkjet ink" refers to a single liquid vehicle that contains at least one pigment, and in accordance with embodiments of the present disclosure, the inks can also include certain more specific classes of solvents and/or surfactants. In one example, the inkjet ink can be a thermal inkjet ink.

As used herein, "pigment" refers to a colorant particle which is typically substantially insoluble in the liquid vehicle in which it is used. Pigments can be conventionally dispersed using a separate dispersing agent, or can be self-dispersed, having a dispersing agent attached to the surface of the pigment.

As used herein, "self-dispersed" generally refers to pigments that have been functionalized with a dispersing agent, such as by chemical attachment of the dispersing agent to the surface of the pigment. The dispersing agent can be a small molecule or a polymer or an oligomer. The dispersing agent can be attached to such pigments to terminate an outer surface of the pigment with a charge, thereby creating a repulsive nature that reduces agglomeration of pigment particles within the liquid vehicle.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLES

The following examples illustrate the embodiments of the disclosure that are presently best known. However, it is to be understood that the following are only exemplary or illustrative of the application of the principles of the present technology. Numerous modifications and alternative compositions and methods may be devised by those skilled in the art without departing from the spirit and scope of the present disclosure. The appended claims are intended to cover such modifications and arrangements.

Example 1

Magenta Ink Formulations

Various magenta ink formulations were prepared in accordance with Tables 1 with difference concentrations of pigment, as follows:

TABLE 1

| Ingredient | Class | Magenta Ink (wt %) |
| --- | --- | --- |
| 2-Pyrrolidinone | Organic Co-solvent | 7.5 |
| Triethylene Glycol | Organic Co-solvent | 10 |
| Dantocol | Organic Co-solvent | 4 |
| Surfynol ® 104 | Surfactant | 0.3 |
| Brij ® O10 | Surfactant | 0.3 |
| Acticide ® B20 | Biocide | 0.16 |
| Acticide ® M20 | Biocide | 0.07 |
| Hydran ™ RW-7581 | Polyurethane Binder | 1.0 |
| PR282 (quinacridone pigment) | Magenta Pigment | Varied |
| PR150 (azo pigment) | Magenta Pigment | Varied |
| Water | Solvent | Balance |

Example 2

CIE La*b* Color Space

The color saturation data as it relates to FIG. 1 and FIG. 2 was obtained by measuring CIE La*b* color coordinates and interpolating data as described herein. It is initially noted that measurements were obtained using PR282 as the quinacridone pigment, but the data provided in FIGS. 1 and 2 is for a slightly different pigment dispersion, namely a solid solution of PV19 and PR122 (which is very similar to PR282). Essentially, it was determined experimentally that the color properties of PR282 compared to the solid solution of PV19 and PR122 as it relates to red saturation and blue saturation curves were only offset only by 0.03 and 0.01 increases in saturation units. These corrections were used to produce the graphs shown in FIGS. 1 and 2. Graphs related more directly to PR282, however, would look very similar to those shown in FIGS. 1 and 2. Thus, for simplicity, the pigment dispersions will be referred to in this example as the "quinacridone pigment" (referring to PR282 interpolated to PV19/PR122) and the "azo pigment" (referring to PR150).

With specific reference to FIG. 1, color saturation data was obtained and interpolated using inks with pigment dispersions of blended quinacridone pigment and azo pigment in accordance with Example 1. These magenta inks were blended at various ratios with a yellow ink, to generate 13 color patches at constant total ink density. The yellow ink used had the same formulation as the magenta ink but with the following changes: the RW-7581 binder was at 0.5 wt %; no Surfynol® 104 was used; and the yellow pigment used was Pigment Yellow 74 at 3.3 wt %. In this example, the blended scale ranged from 100 wt % yellow ink to 100 wt % magenta ink. This produced a yellow to red to magenta color ramp, and thus, was repeated using the magenta inks at different weight ratios of the quinacridone pigment and azo pigment. The total amount of pigment solids used was held constant at 4.2 wt %, and the weight percentages for each of four magenta ink (M1-M4) was as follows: M1=4.2 wt % quinacridone pigment; M2=2.9 wt % quinacridone pigment and 1.3 wt % azo pigment; M3=2.1 wt % quinacridone pigment and 2.1 wt % azo pigment; and M4=4.2 wt % azo pigment.

For each color patch (13 for each specific magenta ink), the CIE L*a*b* color coordinates were measured using a Gretag-MacBeth Spectrolina spectrometer equipped with an X-Y table. The red color saturation at a hue angle of 17° was determined by interpolation from the two color patches that bracketed a desired hue angle.

The complete CIE La*b* color palette in FIG. 1 was determined using the same plot as above, but data from additional ramps of yellow to green to cyan and cyan to blue to magenta were also included. For example, the blue and purple color saturations were determined at hue angles of 270° and 315°. In addition, pure color (CMY) ramps and pure color plus added black (to go from pure CMY to black) were also included. FIG. 1 was then generated by plotting the a*b* data pairs for each color patch. In this case, the cyan and yellow inks were the same but the magenta ink was produced using 100 wt % quinacridone pigment or 100 wt % azo pigment at a 70:30 ratio.

This color saturation data was used as the input data for a statistically designed experiment using JMP9 Software (SAS Corporation) to produce a predictive model of red, blue, and purple saturation as function of the ratio of quinacridone pigment to azo pigment.

With more specific reference to the data present in FIG. 2, various weight ratios of quinacridone pigment to an azo pigment were plotted against the red, blue, and violet color saturation values. These values are derived from the statistical model and not from actual experimental data. The model allows for interpolation to any combination of the quinacridone and azo pigments, within the range explored (4.2 wt % to 0 wt % of each pigment, with total held constant at 4.2 wt %). As can be seen in the graph of FIG. 2, region A indicates an area where an acceptable color balance is struck between blues and reds, which corresponds to a weight ratio of 50:50 to 80:20 of quinacridone pigment to azo pigment. Also shown at region B, an alternative ratio range is shown that also strikes a balance between the pigment dispersions, which corresponds to a weight ratio range of about 65:35 to 75:25.

Example 3

Saturation

Figure 3:
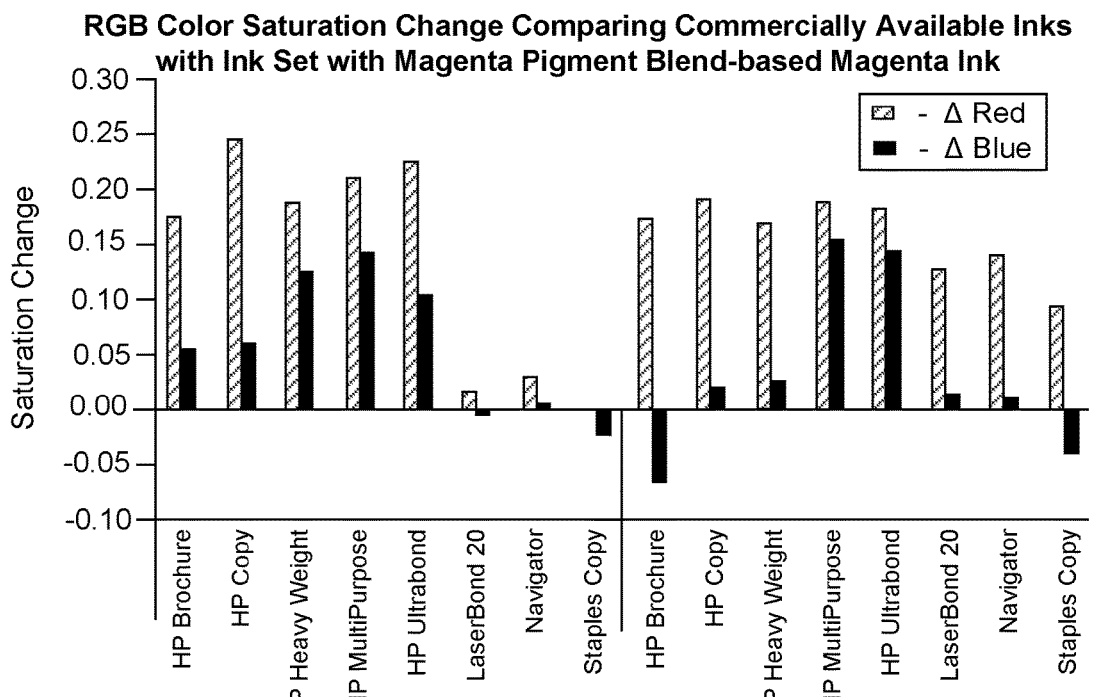
FIG. 3 is an example graph that compares commercially available inks with inks sets that include magenta pigment blend-based magenta inks in accordance with examples of the present disclosure.

An ink formulation similar to that described in Example 1 was prepared, except that instead of PR282, a solid solution of PV19 and PR 122 was used as the quinacridone pigment (at 4.2 wt % total pigment solids). In this example, the quinacridone pigment to azo pigment (PR150) weight ratio was about 70:30. This ink was printed on eight different types of media, and compared against two commercially available inkjet inks (OfficeJet Pro 8000 and OfficeJet Pro X). A saturation difference was determined by measuring the saturation of Red, Green, and Blue for each of the commercial inks, and comparing these commercial inks to the inkjet ink prepared in accordance with the present example. Difference in red (Δ Red), difference in green (Δ Green), and difference in blue (Δ Blue) values were determined. Positive values indicated improved saturation for the ink of the present example, and negative numbers indicated lower saturation for the ink of the present example. The data is shown in FIG. 3.

As can be seen, for 5 types of media, there was a significant improvement in saturation for the magenta ink of the present example over the OfficeJet Pro 8000 ink, and almost no change for the remaining 3 types of media. However, a general improvement in saturation across all colors and all papers was shown for the magenta ink of the present example over the OfficeJet Pro X ink.

Example 4

Pigment Settling

A quinacridone pigment (PR282) and an azo pigment (PR150) were co-dispersed at about a 70:30 weight ratio using a similar dispersant for each pigment, and the pigment blend was formulated into an inkjet ink similar to that described in Example 1. The dispersant used for the pigments was a styrene based resin including at least 60 wt % styrene monomer units, as well as unsaturated aliphatic carboxylic acid monomer units having radical polymerizable double bonds, an acid value of 50 to 300, and a weight average molecular weight of 7500 Mw to 40000 Mw. The ink was stored in an HP 76 ink supply which is designed to hold 775 grams of ink. The 25 cm tall ink supply was stored vertically for 270 days without being disturbed. Samples of the ink were then taken from the top, middle, and bottom of the container, confirming that while the magenta pigments collectively did settle (UV-vis spectra of bottom sample had more absorbance than the top), the ratio of the two pigments did not change, i.e. the pigments settled together at about the same rate. This was judged by the constant ratio of the 534 nm and 567 nm peaks throughout (top, middle and bottom) the ink supply column, i.e. the 534 peak being more representative of the PR282 pigment and the 567 nm peak being representative of the PR150 pigment. It is noted that both pigments do overlap in absorbencies, but the relative heights of the peaks are different for the quinacridone pigment and the azo pigment.

While the present technology has been described with reference to certain examples, those skilled in the art will appreciate that various modifications, changes, omissions, and substitutions can be made without departing from the spirit of the disclosure. It is therefore intended that the disclosure be limited only by the scope of the appended claims.

What is claimed is:

1. A co-dispersed magenta pigment blend, comprising:
    quinacridone pigment dispersed in a liquid, the quinacridone pigment, including:
        Pigment Violet 19 and Pigment Red 122, or
        Pigment Red 282; and
    azo pigment dispersed in the liquid, the azo pigment including Pigment Red 150, wherein the weight ratio of quinacridone pigment to azo pigment is from 50:50 to 80:20 by pigment solids content, and the quinacridone pigment and the azo pigment are co-dispersed in the liquid with one or more dispersing agents including a dispersing agent having an acid value from 50 to 300.

2. The co-dispersed magenta pigment blend of claim 1, wherein the co-dispersed magenta pigment blend is devoid of dye.

3. The co-dispersed magenta pigment blend of claim 1, wherein the co-dispersed magenta pigment blend is devoid of polymer binder.

4. The co-dispersed magenta pigment blend of claim 1, wherein the co-dispersed magenta pigment blend does not exhibit a settling disparity to within +/−3% over 270 days.

5. The co-dispersed magenta pigment blend of claim 1, wherein the dispersing agent is attached to a surface of the pigments and the pigments are self-dispersed.

6. The co-dispersed magenta pigment blend of claim 1, wherein the dispersing agent is a separate component that is associated with a surface of the pigments.

7. The co-dispersed magenta pigment blend of claim 1, wherein the co-dispersed magenta pigment blend is in the form of an ink composition.

8. The co-dispersed magenta pigment blend of claim 1, wherein the quinacridone pigment is from a solid solution of the Pigment Violet 19 and Pigment Red 122.

9. The co-dispersed magenta pigment blend of claim 1, wherein the quinacridone pigment is the Pigment Red 282.

10. The co-dispersed magenta pigment blend of claim 1, wherein the quinacridone pigment and the azo pigment are both dispersed by a common dispersing agent.

11. The co-dispersed magenta pigment blend of claim 10, wherein the dispersing agent includes a styrene based resin including at least 60wt % styrene monomer units and unsaturated aliphatic carboxylic acid monomer units having radical polymerizable double bonds.

12. The co-dispersed magenta pigment blend of claim 10, wherein the dispersing agent has a weight average molecular weight of 7500 Mw to 40000 Mw.

13. The co-dispersed magenta pigment blend of claim 1, wherein the co-dispersed magenta pigment blend is co-dispersed with polymer binder separate from the dispersing agent.

14. A method of formulating a dispersed magenta pigment blend, comprising co-dispersing a first pigment a second pigment together, wherein the first pigment has a stronger color strength in the red areas of CIE Color Coordinate Plot compared to its color strength in the blue areas, wherein the second pigment has stronger color strength in blue areas compared to its color strength in red areas, and wherein the first pigment and the second pigment are co-dispersed in a liquid with one or more dispersing agents including a dispersing agent having an acid value from 50 to 300, wherein the first pigment and the second pigment are included at a weight ratio to improve color strength in the blue areas compared to the first pigment and to improve color strength in the red areas compared to the second pigment.

15. The method of claim 14, wherein the first pigment is a quinacridone pigment and the second pigment is an azo pigment.

16. The method of claim 15, wherein the quinacridone pigment is Pigment Violet 19 and Pigment Red 122, or Pigment Red 282.

17. The method of claim 15, wherein the azo pigment is Pigment Red 150.

18. The method of claim 15, wherein the weight ratio of quinacridone pigment to azo pigment is from 50:50 to 80:20 by pigment solids content.

19. The method of claim 15, wherein the quinacridone pigment and the azo pigment are both dispersed by the same dispersing agent.

20. The method of claim 14, wherein the dispersing agent has an acid value of 50 to 300 and a weight average molecular weight of 7500 Mw to 40000 Mw.

* * * * *